(12) United States Patent
Shim et al.

(10) Patent No.: US 8,619,230 B2
(45) Date of Patent: Dec. 31, 2013

(54) LIQUID CRYSTAL DISPLAY APPARATUS AND METHOD FOR MANUFACTURING THE SAME

(71) Applicant: Samsung Display Co., Ltd., Yongin (KR)

(72) Inventors: Seung-Hwan Shim, Seongnam-si (KR); Gug-Rae Jo, Asan-si (KR); Sung-Hoon Yang, Seoul (KR); Kap-Soo Yoon, Seoul (KR); Ki-Hun Jeong, Cheonan-si (KR); Jae-Ho Choi, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 13/776,029

(22) Filed: Feb. 25, 2013

(65) Prior Publication Data

US 2013/0164870 A1 Jun. 27, 2013

Related U.S. Application Data

(62) Division of application No. 12/686,012, filed on Jan. 12, 2010, now Pat. No. 8,384,871.

(30) Foreign Application Priority Data

Jan. 16, 2009 (KR) .................. 10-2009-0003913

(51) Int. Cl.
G02F 1/1333 (2006.01)
G02F 1/1345 (2006.01)
G02F 1/1339 (2006.01)

(52) U.S. Cl.
USPC ............ 349/152; 349/122; 349/153; 349/187

(58) Field of Classification Search
None
See application file for complete search history.

(56) References Cited

U.S. PATENT DOCUMENTS

| | | | |
|---|---|---|---|
| 5,544,582 A * | 8/1996 | Bocko et al. .................. | 101/211 |
| 6,392,735 B1 | 5/2002 | Tani | |
| 6,466,294 B1 * | 10/2002 | Yamagishi et al. ........... | 349/155 |
| 6,573,969 B1 | 6/2003 | Watanabe et al. | |
| 6,906,771 B2 | 6/2005 | Takahashi et al. | |
| 7,355,669 B2 | 4/2008 | Onda et al. | |
| 7,405,798 B2 * | 7/2008 | Yoo et al. ...................... | 349/153 |

(Continued)

FOREIGN PATENT DOCUMENTS

| | | |
|---|---|---|
| JP | 2007-327985 | 12/2007 |
| KR | 1020030058546 | 7/2003 |

(Continued)

OTHER PUBLICATIONS

Non-Final Office Action dated Feb. 6, 2012 in U.S. Appl. No. 12/686,012.

(Continued)

*Primary Examiner* — Michelle R Connelly
(74) *Attorney, Agent, or Firm* — H.C. Park & Associates, PLC

(57) ABSTRACT

An approach is provided for manufacturing a LCD apparatus. A first substrate is formed by forming a transparent conductive layer on a first transparent insulating substrate and forming a transparent conductive electrode on the transparent conductive layer. A second substrate is formed by forming a thin-film transistor (TFT) on a second transparent insulating substrate and forming a pixel electrode. The first substrate is coupled to the second substrate using a sealing member.

13 Claims, 3 Drawing Sheets

(56) References Cited

U.S. PATENT DOCUMENTS

| | | |
|---|---|---|
| 7,532,279 B2 | 5/2009 | Akimoto |
| 7,646,465 B2 | 1/2010 | Son et al. |
| 7,777,858 B2 | 8/2010 | Yoo et al. |
| 7,868,954 B2 | 1/2011 | Chen et al. |
| 7,907,228 B2 | 3/2011 | Peng |
| 2004/0227895 A1 | 11/2004 | Yoo et al. |
| 2005/0213000 A1 | 9/2005 | Akimoto |
| 2007/0058125 A1 | 3/2007 | Yoo et al. |
| 2009/0081480 A1* | 3/2009 | Takeda et al. ............... 428/690 |

FOREIGN PATENT DOCUMENTS

| | | |
|---|---|---|
| KR | 1020040098429 | 11/2004 |
| WO | WO 9938680 A1 * | 8/1999 |
| WO | WO 2008100105 A1 * | 8/2008 |

OTHER PUBLICATIONS

Final Office Action dated Jul. 13, 2012 in U.S. Appl. No. 12/686,012.
Notice of Allowance dated Oct. 30, 2012 in U.S. Appl. No. 12/686,012.

* cited by examiner

LIQUID CRYSTAL DISPLAY APPARATUS AND METHOD FOR MANUFACTURING THE SAME

CROSS REFERENCE TO RELATED APPLICATIONS

This application is a divisional of U.S. application Ser. No. 12/686,012, filed on Jan. 12, 2010, now U.S. Pat. No. 8,384,871, and claims priority from and the benefit of Korean Patent Application No. 10-2009-0003913, filed on Jan. 16, 2009, each of which is hereby incorporated by reference for all purposes as if fully set forth herein.

BACKGROUND OF THE INVENTION

1. Field of the Invention

The present invention relates to a liquid crystal display (LCD) apparatus and a method for manufacturing the LCD apparatus. More particularly, the present invention relates to an LCD apparatus for stabilizing the potential of a common voltage applied to a common electrode and a method for manufacturing the LCD apparatus.

2. Discussion of the Background

Nowadays, a liquid crystal display (LCD) panel having a common electrode formed on an upper substrate of the LCD panel, for example, a twisted nematic (TN) mode panel, a patterned vertically alignment (PVA) mode panel, a multi-domain vertically alignment (MVA) mode panel and so on, needs to have a larger size, higher resolution and a higher-speed driver. Thus, the potential of the common electrode may be unstable and it may be changed or distorted according to a position and a time period, due to a capacity bonding between the common electrode and adjacent conductors. When the potential of the common electrode is unstable, malfunctions in optical characteristics such as crosstalk, afterimages, flicker and so on may be caused. For example, when the LCD panel has a full high definition (HD) resolution or higher and has a 120 Hz or higher high-speed driver, technology to stabilize the potential of the common electrode regardless of the position and the time period is important.

Until now, there has been the technology to increase the number of short points connecting the common electrode on the upper substrate with a contact electrode on a lower substrate, or to increase the area of a storage electrode on the lower substrate. However, the above-mentioned technology may cause side effects such as decreasing a liquid crystal charging margin, increasing a contact resistance between the terminals and so on, such that a fundamental technology to solve the problem may be necessary.

Alternatively, the contact resistance may be decreased via directly contacting a metal black matrix such as chromium oxide (CrOx) and chromium (Cr) with the common electrode without a protective layer. However, when the protective layer is removed in the PVA mode, a color filter layer may be damaged in patterning the common electrode, and impurities of the color filter layer may flow into a liquid crystal layer. In addition, the usage of chromium is highly restricted because of environmental problems, so that the chromium black matrix may not be practically used to solve the above-mentioned problem.

SUMMARY OF THE INVENTION

Exemplary embodiments of the present invention provide a liquid crystal display apparatus to stabilize the potential of a common electrode according to a position and a time period. Exemplary embodiments of the present invention also provide a method for manufacturing the liquid crystal display apparatus.

Additional features of the invention will be set forth in the description which follows, and in part will be apparent from the description, or may be learned by practice of the invention.

An exemplary embodiment of the present invention discloses a liquid crystal display (LCD) apparatus that includes a first substrate, a second substrate; and a liquid crystal layer disposed between the first and second substrates. The first substrate comprises a transparent insulating substrate, a transparent conductive layer formed over an entire surface of the transparent insulating substrate, and a transparent conductive electrode formed on the transparent conductive layer.

An exemplary embodiment of the present invention also discloses a method of manufacturing an LCD apparatus, the method includes forming a first substrate, forming a second substrate, and combining the first substrate with the second substrate using a sealing member. The first substrate is formed by forming a transparent conductive layer on a first transparent insulating substrate and forming a transparent conductive electrode on the transparent conductive layer. The second substrate is formed by forming a thin-film transistor (TFT) on a second transparent insulating substrate and forming a pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
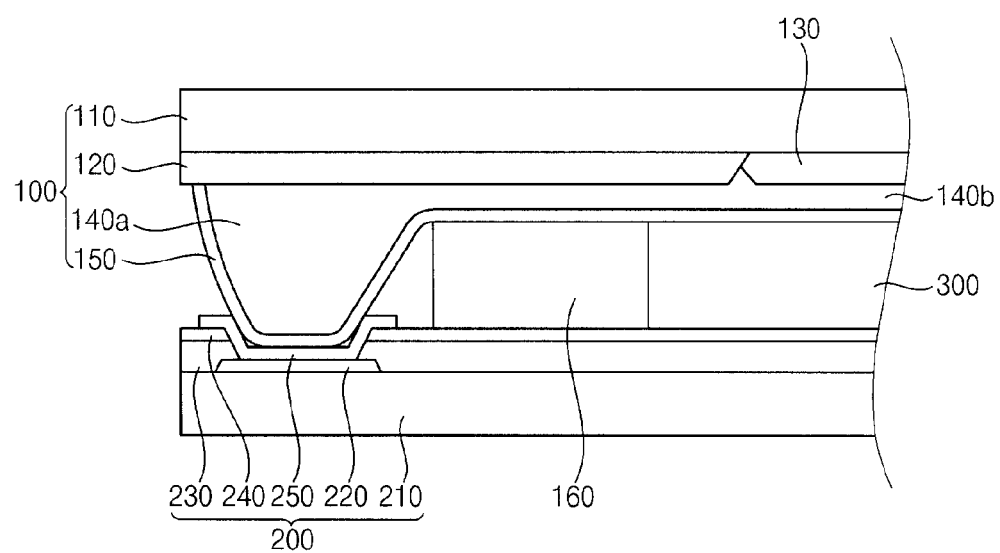
FIG. 1 is a cross-sectional view illustrating a liquid crystal display (LCD) apparatus according to a first exemplary embodiment of the present invention.

The invention is described more fully hereinafter with reference to the accompanying drawings, in which embodiments of the present invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the sizes and relative sizes of layers and regions may be exaggerated for clarity. Like reference numerals in the drawings denote like elements.

It will be understood that when an element or layer is referred to as being "on," "connected to" or "coupled to"

another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a cross-sectional view illustrating a liquid crystal display (LCD) apparatus according to a first example embodiment of the present invention.

Referring to FIG. 1, the LCD apparatus according the present example embodiment includes a black matrix 120 and a color filter 130 inside of an upper glass substrate 110. The black matrix 120 and the color filter 130 may be formed on a lower glass substrate 210 or may be omitted. Generally, the black matrix 120 is formed on a non-display area on which a sealant 160 combining an upper substrate 100 with a lower substrate 200 is formed, a boundary area (not shown) of a pixel is formed, and a thin-film transistor (TFT) (not shown) is formed, to prevent a light leakage and light deterioration of a TFT layer. The black matrix 120 may include an organic material or chromium (Cr), but chromium (Cr) may cause an environmental problem, and thus the organic material may be substituted for chromium. A protective layer 140a and 140b is formed on the organic black matrix 120 and the color filter 130 to planarize a surface and to protect the color filter 130.

The protective layer 140a and 140b according to the present exemplary embodiment includes a flat portion 140b and a protrusion portion 140a. The protrusion portion 140a is disposed outside of a sealant 160, and makes electric contact with a contact electrode 250 of the lower substrate 200 through a common electrode 150 covering the protrusion portion 140a. Thus, a common voltage applied from outside is transmitted to the common electrode 150 through the contact electrode 250. A horizontal-sectional shape of the protrusion portion 140a may be a circular shape such as a column spacer, a rectangular shape, a triangular shape, a pentagonal shape, etc. and not limited thereto. The protrusion portion 140a may be disposed in every position of a panel. In addition, the protrusion portion 140a may have a longitudinal dam shape, and in this case the number of the protrusion portions 140a and the position of the protrusion portion 140a may not be limited to the examples mentioned above. For example, the size of the protrusion portion 140a is not limited, but a diameter of the protrusion portion 140a is in a range from about several micrometers to about several tens of micrometers, for example, in a range from about 3 μm to about 4 μm. The size of the protrusion portion 140a may be changed according to the size of the panel, the number of the protrusion portions 140a and a position of the protrusion portion 140a.

The LCD apparatus according to the present exemplary embodiment includes a transparent conductive material as the protective layer 140a and 140b, such as a conductive polymer. The conductive polymer may include ORGACON (TM) EL-P3000 series or EL-P5000 series (made by Agfa Materials), or the transparent conductor (TC) CLEAROHM (TM) (made by Cambrios Technologies Corp.). In addition, newly developed conductive polymers may be used. The conductive polymer includes high conductivity, strong adhesiveness to indium tin oxide (ITO) or indium zinc oxide (IZO) used for the common electrode 150, high protectiveness and ease in manufacturing.

The contact electrode 250 of the lower substrate 200 makes direct contact with a gate metal electrode 220 formed on the lower glass substrate 210 through a contact hole which is formed through a passivation layer 230 and 240. The passivation layer 230 and 240 according to the present exemplary embodiment includes two layers sequentially formed with each other, and includes silicon nitride (SiNx) or silicon oxide (SiOx). The contact electrode 250 includes a transparent conductive material such as ITO or IZO such as a pixel electrode, and the contact electrode 250 and the pixel electrode may be formed via substantially the same process at the same time. An organic layer may be formed on the passivation layer 230 and 240 to increase an aperture ratio, but the organic layer may be removed in the non-display area. Alternatively, the contact electrode 250 may be formed to make contact with a data metal electrode.

Figure 2:
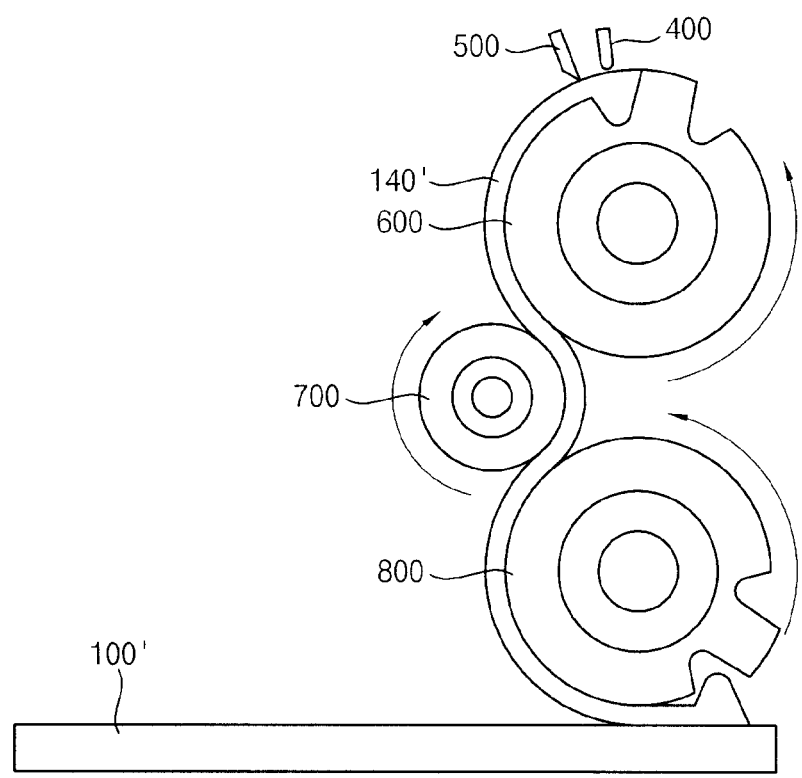
FIG. 2 is a conceptual diagram illustrating a method for manufacturing the LCD apparatus according to the first exemplary embodiment of the present invention.

FIG. 2 is a conceptual diagram illustrating a method for manufacturing the LCD apparatus according to the first exemplary embodiment of the present invention.

Referring to FIGS. 1 and 2, the method for manufacturing the LCD apparatus may be as follows.

A process for manufacturing the upper substrate 100 will be described with reference to FIGS. 1 and 2. An incomplete upper substrate 100' including the upper glass substrate 110 on which the black matrix 120 and the color filter 130 are formed, is prepared. The black matrix 120 and the color filter 130 are generally formed on the upper glass substrate 110 of the LCD apparatus, but the process for forming the black matrix 120 and the color filter 130 is not a particularly limiting process in the present exemplary embodiment. Then, the conductive polymer is formed on the incomplete upper substrate 100' as the protective layer 140a and 140b. A gravure-offset printing process may be used in forming the conductive polymer protective layers 140a and 140b as illustrated in FIG. 2.

The gravure-offset printing process is explained as follows. First, a conductive polymer ink 140' is injected from an ink injection slit nozzle 400 to a surface of a rotating gravure roll 600, and the conductive polymer ink 140' is attached according to a pattern formed on the gravure roll 600. In this case, remaining ink 140' is gathered by a doctor blade 500 to be recycled. Then, the ink 140' is transcribed on a surface of a first blanket roll 700 which rotates opposite to the gravure roll 600, and the ink 140' is transcribed on a surface of a second blanket roll 800 which rotates opposite to the first blanket roll 700. Then, the conductive polymer ink 140' is transcribed on a surface of the incomplete upper substrate 100'.

The pattern formed on the surface of the gravure roll 600 depends on a pattern of the protective layer 140a and 140b of the incomplete upper substrate 100'. Generally, the gravure roll 600 includes a high-pressure carbon steel supporting body, a copper coating layer formed on the supporting body not to be affected by a laser machining, a black coating layer formed on the copper coating layer and machined by the laser machining to form the pattern, and a chromium (Cr) layer formed on the black coating layer to protect the surface. The first blanket roll 700 and the second blanket roll 800 include a carbon steel supporting body and a silicone rubber blanket enclosing the supporting body. The first blanket roll 700 and the second blanket roll 800 include a blanket fixing portion and a tension control portion formed respectively fixing the blanket and controlling the tension. The components and characteristics of the gravure roll 600, the first blanket roll 700 and the second blanket roll 800 are well-known technology and thus an additional explanation concerning the above elements will be omitted. However, compared to the conventional process, the present example embodiment includes the process using two blanket rolls 700 and 800, so that an exposed surface of the ink 140' formed on the gravure roll 600 may make contact with the incomplete upper substrate 100'

The processes after forming the protective layer 140a and 140b may be substantially the same as the conventional processes. However, in the present exemplary embodiment, the common electrode 150 formed on the protrusion portion 140a of the protective layer makes direct contact with the contact electrode 250 of the lower substrate 200 to receive the common potential, and thus a short spacer to apply the common potential to the common electrode used in the conventional processes is not needed. Thus, the method for manufacturing the LCD apparatus according to the present exemplary embodiment may omit the process for forming the short spacer, so that productivity may be increased and costs may be reduced.

In the present exemplary embodiment, the gravure-offset printing process is used, but a relief printing process, a lithographic printing process or a screen printing process may be used. In addition, the pattern may be formed using a mask after a slit-coating or a spin-coating, and the pattern forming process is not limited thereto.

Figure 3:
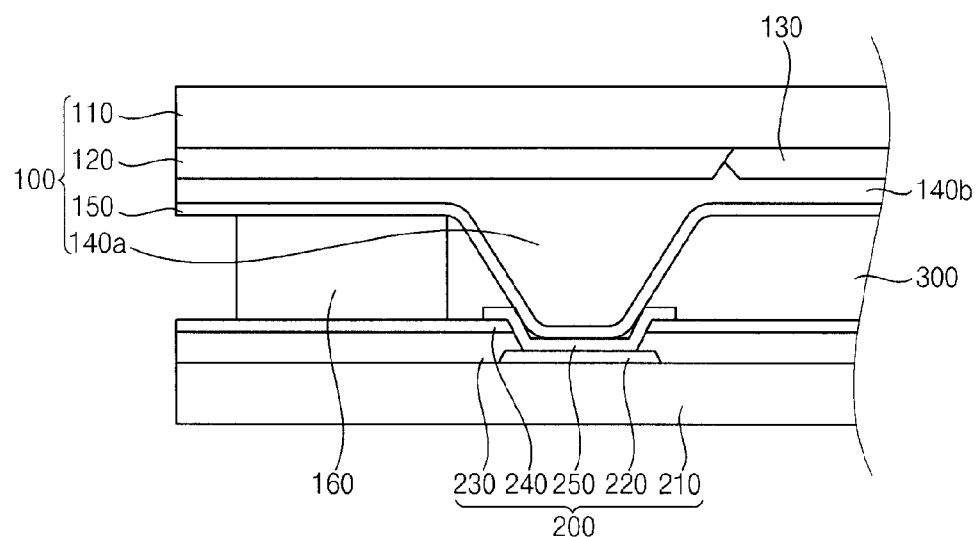
FIG. 3 is a cross-sectional view illustrating an LCD apparatus according to a second exemplary embodiment of the present invention.

FIG. 3 is a cross-sectional view illustrating an LCD apparatus according to a second exemplary embodiment of the present invention.

The LCD apparatus according to the present exemplary embodiment is substantially the same as the first exemplary embodiment except that the protrusion portion 140a is disposed inside of the sealant 160. For example, the protrusion portion 140a is disposed inside of the sealant 160 with respect to a central portion of the LCD apparatus, to be surrounded by a liquid crystal layer 300. The method for manufacturing the LCD apparatus according to the present exemplary embodiment is substantially the same as the method for manufacturing the LCD apparatus according to the first exemplary embodiment.

Figure 4:
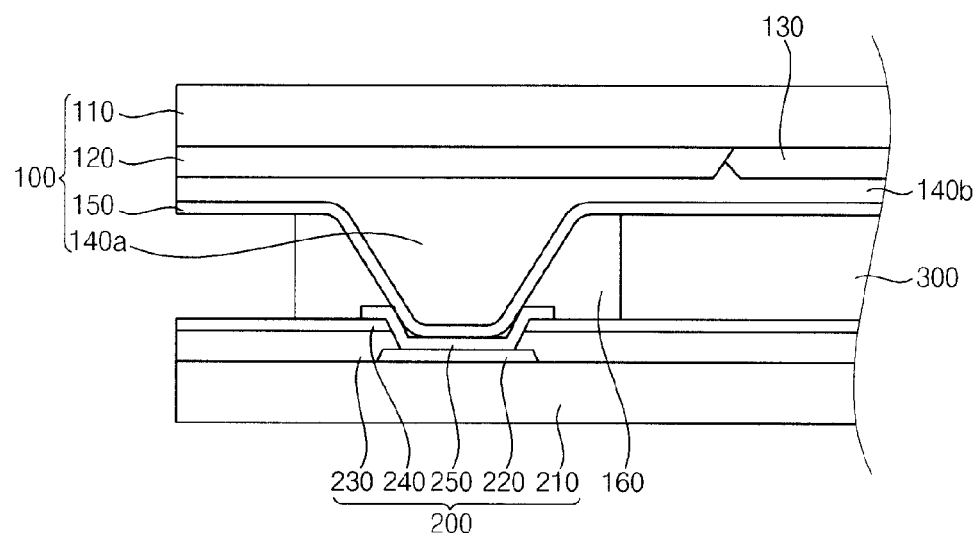
FIG. 4 is a cross-sectional view illustrating an LCD apparatus according to a third exemplary embodiment of the present invention.

FIG. 4 is a cross-sectional view illustrating an LCD apparatus according to a third exemplary embodiment of the present invention.

The LCD apparatus according to the present exemplary embodiment is substantially the same as the first and second exemplary embodiments except that the protrusion portion 140a is disposed within the sealant 160. The method for manufacturing the LCD apparatus according to the present example embodiment is substantially the same as the method for manufacturing the LCD apparatus according to the first and second exemplary embodiments. In the process of assembling the upper substrate 100 and the lower substrate 200, a pressure should be properly applied to make contact the common electrode 150 of the upper substrate 100 with the contact electrode 250 of the lower substrate 200 and the viscosity of the sealant 160 should be controlled.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:
1. A method for manufacturing an LCD apparatus, the method comprising:
    forming a first substrate;
    forming a second substrate; and
    coupling the first substrate and the second substrate together, wherein the first substrate is formed by forming a transparent conductive layer, comprising a first material, on a first transparent insulating substrate and forming a transparent conductive electrode, comprising a second material different from the first material, on the transparent conductive layer, and wherein the second substrate is formed by forming a thin-film transistor (TFT) on a second transparent insulating substrate and forming a pixel electrode.

2. The method of claim 1, wherein the transparent conductive layer comprises a conductive polymer.

3. The method of claim 2, wherein the transparent conductive layer is formed via a gravure-offset printing process.

4. The method of claim 3, wherein the transparent conductive layer is formed by:

disposing a transparent conductive ink on a surface of a gravure roll;

transcribing the transparent conductive ink of the surface of the gravure roll on a first blanket roll;

transcribing the transparent conductive ink of the first blanket roll on a second blanket roll; and transcribing the transparent conductive ink of the second blanket roll on the first transparent insulating substrate.

5. The method of claim 4, wherein the gravure roll and the second blanket roll rotate in a first direction, and the first blanket roll rotates in a second direction different from the first direction.

6. The method of claim 4, wherein the gravure roll includes a single pattern formed on the surface of the gravure roll, the single pattern having a first depth and a second depth deeper than the first depth.

7. The method of claim 3, wherein the gravure-offset printing process utilizes a gravure roll and a deposition roll.

8. The method of claim 7, wherein the gravure roll and the deposition roll each have a semi-cylindrical shape.

9. The method of claim 8, further comprising a blanket roll disposed between the gravure roll and the deposition roll, the blanket roll having a cylindrical shape.

10. The method of claim 9, wherein the gravure roll and the deposition roll rotate in a first direction, and the blanket roll rotates in a second direction different from the first direction.

11. The method of claim 8, wherein the gravure roll and the deposition roll each have a cylindrical portion, a first groove, a second groove, and a protruding portion.

12. The method of claim 11, wherein the cylindrical portion extends from a first edge of the first groove to a first edge of the second groove, and the protruding portion protrudes from a second edge of the first groove and a second edge of the second groove.

13. The method of claim 1, wherein the first substrate and the second substrate are coupled together using a sealing member.

\* \* \* \* \*